United States Patent
Mayor et al.

(10) Patent No.: US 9,116,002 B2
(45) Date of Patent: Aug. 25, 2015

(54) CONTEXT DETERMINATION TO ASSIST LOCATION DETERMINATION ACCURACY

(75) Inventors: Robert Mayor, Half Moon Bay, CA (US); Ronald Keryuan Huang, Milpitas, CA (US); Patrick Piemonte, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 663 days.

(21) Appl. No.: 12/549,250

(22) Filed: Aug. 27, 2009

(65) Prior Publication Data

US 2011/0054787 A1    Mar. 3, 2011

(51) Int. Cl.
| | |
|---|---|
| G01C 21/30 | (2006.01) |
| G01C 21/16 | (2006.01) |
| G01C 21/34 | (2006.01) |
| G01S 19/49 | (2010.01) |
| G01C 21/26 | (2006.01) |
| G01C 21/28 | (2006.01) |

(52) U.S. Cl.
CPC .......... *G01C 21/165* (2013.01); *G01C 21/3415* (2013.01); *G01S 19/49* (2013.01); *G01C 21/26* (2013.01); *G01C 21/28* (2013.01); *G01C 21/30* (2013.01)

(58) Field of Classification Search
CPC .. G01C 21/165; G01C 21/3415; G01C 21/26; G01C 21/28; G01C 21/30; G01S 19/49
USPC ............................ 701/412, 413; 33/268–271; 340/988–996
See application file for complete search history.

(56) References Cited

U.S. PATENT DOCUMENTS

| | | | |
|---|---|---|---|
| 5,075,693 | A | 12/1991 | McMillan et al. |
| 5,165,269 | A | 11/1992 | Nguyen |
| 5,349,529 | A | 9/1994 | Masumoto et al. |
| 5,761,094 | A | 6/1998 | Olson et al. |
| 5,946,813 | A | 9/1999 | Nachbaur et al. |
| 6,311,129 | B1 | 10/2001 | Lin |
| 6,384,384 | B1 | 5/2002 | Connolly et al. |
| 6,408,245 | B1 | 6/2002 | An et al. |
| 6,424,914 | B1 | 7/2002 | Lin |
| 6,508,316 | B2 | 1/2003 | Estes et al. |
| 6,539,639 | B2 | 4/2003 | Smith |
| 6,622,091 | B2 | 9/2003 | Perlmutter et al. |
| 6,651,003 | B2 | 11/2003 | Woloszyk et al. |
| 6,768,452 | B2 | 7/2004 | Gilkes |

(Continued)

FOREIGN PATENT DOCUMENTS

| | | |
|---|---|---|
| EP | 1 221 586 | 7/2002 |
| JP | 2005-134343 | 5/2005 |

(Continued)

OTHER PUBLICATIONS

Piemonte, et al., "Dynamic Compass Calibration in a Portable Device", U.S. Appl. No. 12/479,203, filed Jun. 5, 2009.

(Continued)

*Primary Examiner* — James Trammell
*Assistant Examiner* — Majdi Alsomiri
(74) *Attorney, Agent, or Firm* — Fish & Richardson P.C.

(57) ABSTRACT

A location aware device includes a navigation system and one or more environment sensors. Sensor output(s) are aggregated and used to determine a context for the location aware device. Based on the determined context, context data is generated and provided to a navigation engine where it can be used to determine a navigation solution.

17 Claims, 6 Drawing Sheets

(56) References Cited

U.S. PATENT DOCUMENTS

| | | | |
|---|---|---|---|
| 6,807,485 B1 | 10/2004 | Green | |
| 6,964,107 B1 | 11/2005 | Ahola | |
| 6,988,049 B1 | 1/2006 | Wirtz et al. | |
| 7,196,660 B2 | 3/2007 | Abraham | |
| 7,210,236 B2 | 5/2007 | Sato et al | |
| 7,248,983 B2 | 7/2007 | Fillatreau et al. | |
| 7,275,008 B2 | 9/2007 | Plyvanainen | |
| 7,324,906 B2* | 1/2008 | Sato et al. | 702/85 |
| 7,331,115 B2 | 2/2008 | Schierbeek et al. | |
| 7,346,452 B2* | 3/2008 | Ford et al. | 701/472 |
| 7,388,541 B1* | 6/2008 | Yang | 342/464 |
| 7,391,366 B2 | 6/2008 | Park et al. | |
| 7,400,974 B2* | 7/2008 | Fuchs et al. | 701/484 |
| 7,415,354 B2* | 8/2008 | Alexander | 701/474 |
| 7,451,549 B1 | 11/2008 | Sodhi et al. | |
| 7,458,166 B2 | 12/2008 | Parks et al. | |
| 7,548,200 B2 | 6/2009 | Garin | |
| 7,565,839 B2 | 7/2009 | Stewart et al. | |
| 7,631,119 B2 | 12/2009 | Moore | |
| 8,061,049 B2 | 11/2011 | Mayor et al. | |
| 2003/0135327 A1 | 7/2003 | Levine et al. | |
| 2005/0174324 A1 | 8/2005 | Liberty et al. | |
| 2005/0223575 A1 | 10/2005 | Fillatreau et al. | |
| 2005/0240347 A1 | 10/2005 | Yang | |
| 2005/0246099 A1 | 11/2005 | Jendbro et al. | |
| 2006/0066295 A1 | 3/2006 | Tamura et al. | |
| 2006/0190174 A1 | 8/2006 | Li et al. | |
| 2006/0195254 A1 | 8/2006 | Ladetto et al. | |
| 2006/0212182 A1 | 9/2006 | Shaw | |
| 2006/0271295 A1 | 11/2006 | McLaren et al. | |
| 2007/0103461 A1 | 5/2007 | Suzuno et al. | |
| 2007/0156337 A1 | 7/2007 | Yanni | |
| 2008/0066331 A1 | 3/2008 | Brzezinski et al. | |
| 2008/0143595 A1* | 6/2008 | Colley et al. | 342/357.12 |
| 2008/0147686 A1* | 6/2008 | Colley et al. | 707/100 |
| 2008/0201096 A1 | 8/2008 | Wright et al. | |
| 2009/0033807 A1 | 2/2009 | Sheng et al. | |
| 2009/0054075 A1 | 2/2009 | Boejer | |
| 2009/0070058 A1 | 3/2009 | Lin | |
| 2009/0089001 A1 | 4/2009 | Lin | |
| 2009/0164067 A1 | 6/2009 | Whitehead et al. | |
| 2009/0171607 A1 | 7/2009 | Chen et al. | |
| 2009/0172599 A1 | 7/2009 | Nezu | |
| 2009/0326851 A1 | 12/2009 | Tanenhaus | |
| 2010/0121509 A1 | 5/2010 | Boeve et al. | |
| 2010/0188276 A1 | 7/2010 | Griffith et al. | |
| 2010/0305853 A1 | 12/2010 | Schulze et al. | |
| 2011/0106474 A1 | 5/2011 | Kulik et al. | |

FOREIGN PATENT DOCUMENTS

| | | |
|---|---|---|
| JP | 2009-192495 | 8/2009 |
| JP | 2010-054431 | 3/2010 |
| WO | WO 2005/040991 | 5/2005 |
| WO | WO 2008/122904 | 10/2008 |
| WO | WO 2009/068116 | 6/2009 |

OTHER PUBLICATIONS

Mayor et al., "Accuracy Indications for an Electronic Compass in a Portable Device", U.S. Appl. No. 12/479,196, filed Jun. 5, 2009.
Harper et al., "Process for Improving GPS acquisition assistance data and server-side location determination for cellular networks," 2004 Intl Symp on GNSS/GPS, Dec. 6-8, 2004, Sydney, Australia, 15 pages.
Seong Yun Cho et al., "A Calibration Technique for a Two-Axis Magnetic Compass in Telematics Devices", Jun. 2005, ETRI Journal, vol. 27, No. 3, pp. 280-288.
Chris M. Goulet, "Magenetic Declination, Frequently Asked Questions", Oct. 2001, Version 4.4, [Online] [Retrieved on May 16, 2009]. Retrieved from the Internet: URL: http://www.geocities.com/magnetic_declination/, 16 pages.
PNI Sensor Corporation, "Calibration Computations for Practical Compassing using the PNI-11096 Magnetometer ASIC", Aug. 2008, PNI Corporation © 2001, Santa Rosa, CA, 3 pages.
PNI Sensor Corporation, "Multipoint Calibration Primer", (no publication date available), PNI Corporation, Santa Rosa, CA, 10 pages.
An Overview of the Earth's Magnetic Field, "The Earth's Magnetic Field—An Overview", [Online] [Retrieved on May 16, 2009]. Retrieved from the Internet: URL: http://www.geomag.bgs.ac.uk/earthmag.html, 10 pages.
The Earth's magnetic field, EPS 122: Lecture 5—Earth's magnetic field, 11 pages.
Apptism, iTopoMaps, © 2009 Apptism, [Online] [Retrieved on Jun. 2, 2009]. Retrieved from the Internet: URL: http://www.apptism.com/apps/itopomaps, 4 pages.
Apptism, Compass Go, © 2009 Apptism, [Online] [Retrieved on Jun. 3, 2009]. Retrieved from the Internet: URL: http://www.apptism.com/apps/compass-go, 2 pages.
Apptism, Focalware, © 2009 Apptism, [Online] [Retrieved on Jun. 3, 2009]. Retrieved from the Internet: URL: http://www.apptism.com/apps/focalware, 2 pages.
Huang et al., "Automatically Identifying Geographic Direction", U.S. Appl. No. 12/477,865, filed Jun. 3, 2009.
Mayor et al., "Restoring and Storing Magnetometer Calibration Data", U.S. Appl. No. 12/479,483, filed Jun. 5, 2009.
Mayor et al., "Magnetometer Accuracy and Use", U.S. Appl. No. 12/479,717, filed Jun. 5, 2009.
Adiprawita et al., "Development of AHRS (Attitude and Heading Reference System) for Autonomous UAV (Unmanned Aerial Vehicle)," Proc Int'l Conf Electrical Engineering and Informatics, Institut Teknologi Bandung, Indonesia, Jun. 17-19, 2004, 4 pages.
Zhang and Gao, "A Novel Auto-calibration Method of the Vector Magnetometer," Ninth Intl Conf on Electronic Measurement & Instruments, ICEMI '2009, pp. 1-145 through pp. 1-150.
Camps et al., "Numerical Calibration for 3-Axis Accelerometers and Magnetomors," IEEE, 2009, pp. 217-231.
"Honeywell 3-Axis Digital Compass IC, HMC5843 Electronic Compass," Honeywell International Inc. [online]; retrieved from the Internet: <URL: http://www.honeywell.com/sites/portal?smap=aerospace&page=Magnetic-Sensors3&theme=T15&catID=CF841317AB-A90E-716D-10BC-A1E75441138E&id=HF916B4E0-4F71-9DB5-DFA8-51B1944918EE&sel=2&se14=1>, retrieved on Jun. 5, 2005, 1 page.
Westerberg, "Compass Go," Apple Apps Store, Oct. 10, 2008, 3 pages.
Moore et al., "Calibrating Sensor Measurements on Mobile Devices," U.S. Appl. No. 12/886,494, filed Sep. 20, 2010.
Piemonte et al., "Determining Heading Using Magnetometer Data and angular Rate Data", U.S. Appl. No. 12/886,531, filed Sep. 20, 2010.
Tu, "Magnetometer Calibration," U.S. Appl. No. 12/899,392, filed Oct. 6, 2010.
Mayor et al., Magnetometer Accuracy and Use, U.S. Appl. No. 13/669,403, filed Nov. 5, 2012.

* cited by examiner

CONTEXT DETERMINATION TO ASSIST LOCATION DETERMINATION ACCURACY

TECHNICAL FIELD

This subject matter is related generally to location aware mobile devices.

BACKGROUND

Conventional mobile devices are often dedicated to performing a specific application. For example, a mobile phone provides telephony services, a personal digital assistant (PDA) provides a way to organize addresses, contacts and notes, a media player plays content, email devices provide email communication, etc. Modern mobile devices can include two or more of these applications. Due to the size limitation of a typical mobile device, such mobile devices may need to rely on a network or other remote service to support these multiple applications. For example, a map service may provide maps to a mobile device over a network, which can be used with one or more applications running on the mobile device. The introduction of a navigation system integrated with, or coupled to, the mobile device provides additional opportunities for providing location-based services.

Modern navigation systems include satellite based navigation systems, such as Global Positioning System (GPS). Satellite based navigation systems tend to be accurate. However, due to the nature of the navigation algorithms employed by these navigation systems, there can be undesirable errors in the navigation solutions which manifest as position overshoots, hovering and other anomalies.

SUMMARY

A location aware device includes a navigation system and one or more environment sensors. Sensor output(s) are aggregated and used to determine a context for the location aware device. Based on the determined context, context data is generated and provided to a navigation engine where it can be used to determine a navigation solution.

An advantage provided by the disclosed implementations is that more accurate navigation solutions can be computed which can result in a better user experience with a navigation system.

DETAILED DESCRIPTION

Overview

Figure 1:
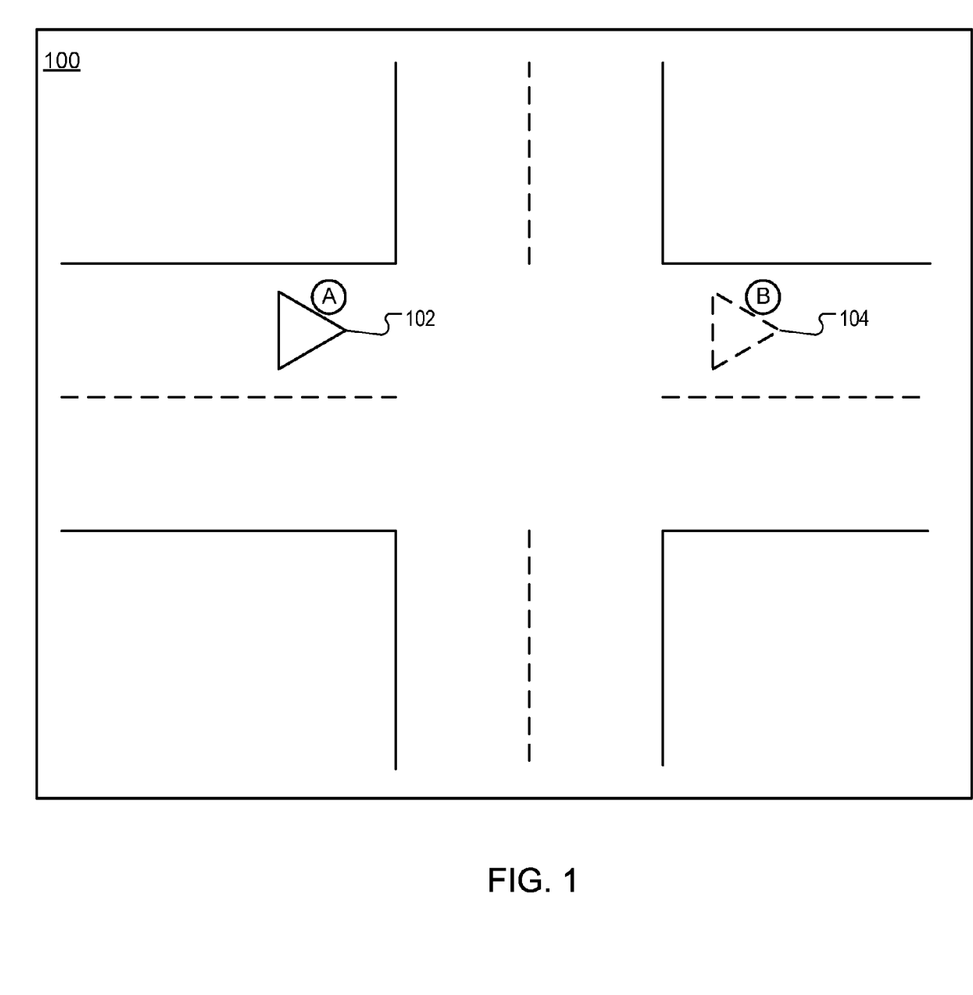
FIG. 1 illustrates location determination inaccuracy associated with conventional navigation systems in accordance with some implementations.

FIG. 1 illustrates location determination inaccuracy associated with conventional navigation systems. In the example shown, navigation display 100 displays location marker 102, marking an accurate estimated location (location A) of a location aware device. Location marker 104 shown on navigation display 100 marks an inaccurate estimated location (location B) of the location aware device. Location B is inaccurate due to an inaccurate navigation solution. An inaccurate navigation solution can result from a variety of factors, including but not limited to: an insufficient number of satellites available, poor satellite geometry, multi-path signals from nearby buildings or objects, etc. One or more of these factors can result in an inaccurate navigation solution which can manifest itself on navigation display 100 as location marker 104. Such inaccuracies can result in a poor user experience with a navigation system.

System Overview

Figure 2:
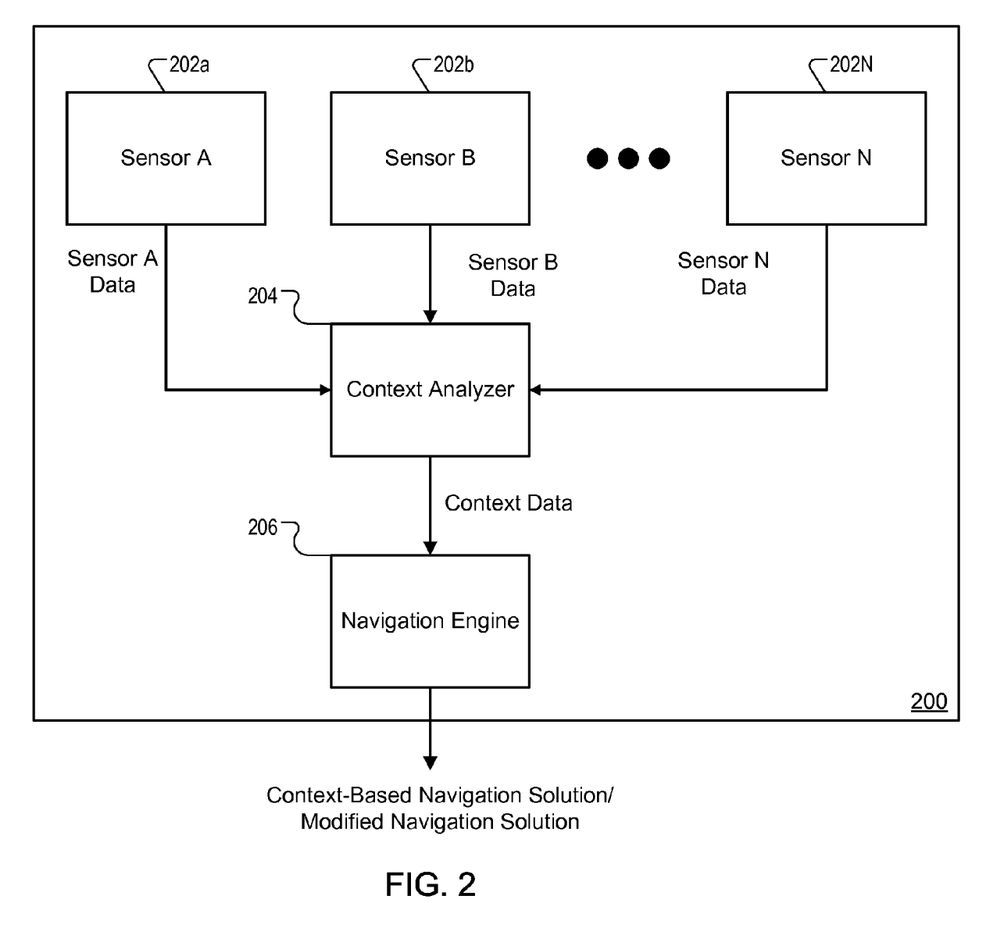
FIG. 2 is a block diagram of an example system for determining context for assisting location determination accuracy in accordance with some implementations.

FIG. 2 is a block diagram of an example system 200 for determining context for assisting location determination accuracy. In some implementations, system 200 can include one or more sensors 202, context analyzer 204 and navigation engine 206. Some examples of sensors can include but are not limited to: accelerometers, gyroscopes, magnetometers, light sensors, vibration sensors, audio sensors, proximity sensors, etc.

The one or more sensors 202 provide output that is received by context analyzer 204. For example, an accelerometer sensor can provide raw or processed acceleration data and a gyroscope or magnetometer can provide raw or processed orientation information.

The combination of sensor outputs can be analyzed by context analyzer 204, and context data can be generated as output of context analyzer 204. In some implementations, the sensor outputs can be compared with reference data (e.g., a database) to determine a context for the location aware device. In some implementations, the sensor outputs can be normalized, scaled or otherwise formatted prior to the comparison with reference data. The context data is data that describes the context of the location aware device.

System 200 will now be described in the context of an example scenario. In this scenario, a user has approached a street intersection and is operating a navigation system, as shown in FIG. 1. When the user stops at location A, accelerometer output can be checked by context analyzer 204 to determine whether the location aware device has stopped. For example, if the accelerometer output after factoring out acceleration due to Earth's gravitational field indicates no acceleration or movement except for some noise, context analyzer 204 can generate context data that indicates that the location aware device has stopped. Additionally, magnetometer or gyroscope data can be analyzed to determine whether the location aware device is turning or rotating. For example, if the magnetometer or gyroscope output indicates no rotation or rotation rate except for possibly some noise, context analyzer 204 can generate context data that indicates that the location aware device is not turning.

Generally, context data can be any data that indicates or describes a context of a location aware device. For example, context data can be a simple flag or binary value, or one or more bytes or words of digital data depending on the amount of detailed information generated by context analyzer 204.

In some implementations, context data can be used directly by navigation engine 206 to compute a navigation solution or modify a navigation solution previously computed by navigation engine 206 without context data. For example, context data can include one or more weights that can be used directly, or with some modification, by a navigation algorithm (e.g., a Kalman filter). In some implementations, context data can be input to a GPS receiver, where the data can be used by a Kalman filter to weight GPS and sensor measurements to provide an overall optimal navigation solution that is more accurate then using GPS alone, as described in reference to FIGS. 5 and 6.

In some implementations, GPS and inertial navigation system (INS) data (e.g., accelerometers, gyroscopes) can be processed by a linear Kalman filter. The GPS data can be taken as external measurement input and the INS data can be taken as additional information to the Kalman filter's state prediction.

Process Overview

Figure 3:
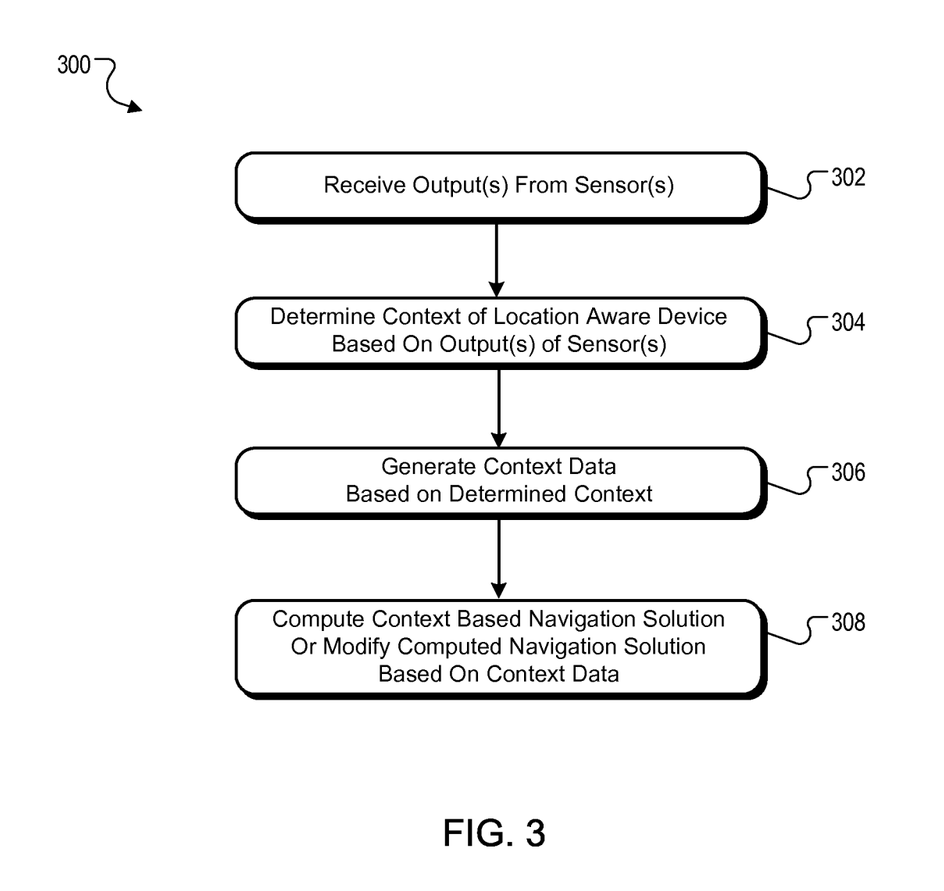
FIG. 3 is a flow diagram of an example process for determining context for assisting location determination accuracy in accordance with some implementations.

FIG. 3 is a flow diagram of an exemplary process 300 for determining context for assisting location determination accuracy. For convenience, process 300 will be described in reference to system 200. The steps of process 300 need not occur sequentially or in the order described below.

In some implementations, process 300 can include receiving one or more outputs from a number of sensors (302). Some examples of sensors include but are not limited to: accelerometers, magnetometers, gyros, vibration sensors, proximity sensors, ambient light or noise sensors, etc. A context of the location aware device can be determined based on sensor output(s) (304). In some implementations, context analyzer 204 can use logic to determine a motion class for the location aware device based on received sensor outputs.

In some implementations, a given sensor output can be monitored for statistical consistency where the output may reach a threshold for a given period of time. In general, standard deviation, overall variation and/or a running average can be monitored to determine if a certain maximum or minimum threshold value is exceeded. For example, evidence of non-movement can be determined by monitoring aggregate accelerometer data by calculating a running average of sensor output at a particular rate and classifying a state of the location aware device as "moving" or "stopped" if the output shows a specific variation for the given period of time. For a given period of time, if running average aggregated data has a variation less than a set value, then the device can be classified as "stopped." For a magnetometer or gyroscope, if the averaged output at a particular rate shows a standard deviation exceeding a set threshold, then the device can be classified as "turning" or "not turning." These classifications can also be determined using probabilities. For example, a percentage of confidence based on averaged historic sensor output can be computed and used to assume a particular state of a location aware device rather than looking for the sensor output to meet a threshold.

Context data can be generated based on the determined context (306). For example, if the context is determined to be that the location aware device is not turning based on output of, for example, a magnetometer or gyroscope, then a signal can be generated indicating that the location aware device is not turning. This signal can be sent to a navigation engine where the signal can be used to compute a navigation solution, or alternatively, the signal can be used to modify a computed navigation solution (308). If the navigation engine is included in an integrated circuit (IC) chip (e.g., included in a GPS receiver IC chip or SoC), then a signal(s) can be provided as input on one or more pins of the IC chip. For example, a signal(s) indicating that the location aware device is "turning" and/or "moving" can be applied to one or more input pins of the IC chip. Software and/or circuitry in the IC chip can detect and decode the signal(s), then modify a navigation algorithm using the decoded signal(s) (e.g., modify weights of a Kalman filter), to get a more accurate navigation solution.

Example Mobile Device Architecture

Figure 4:
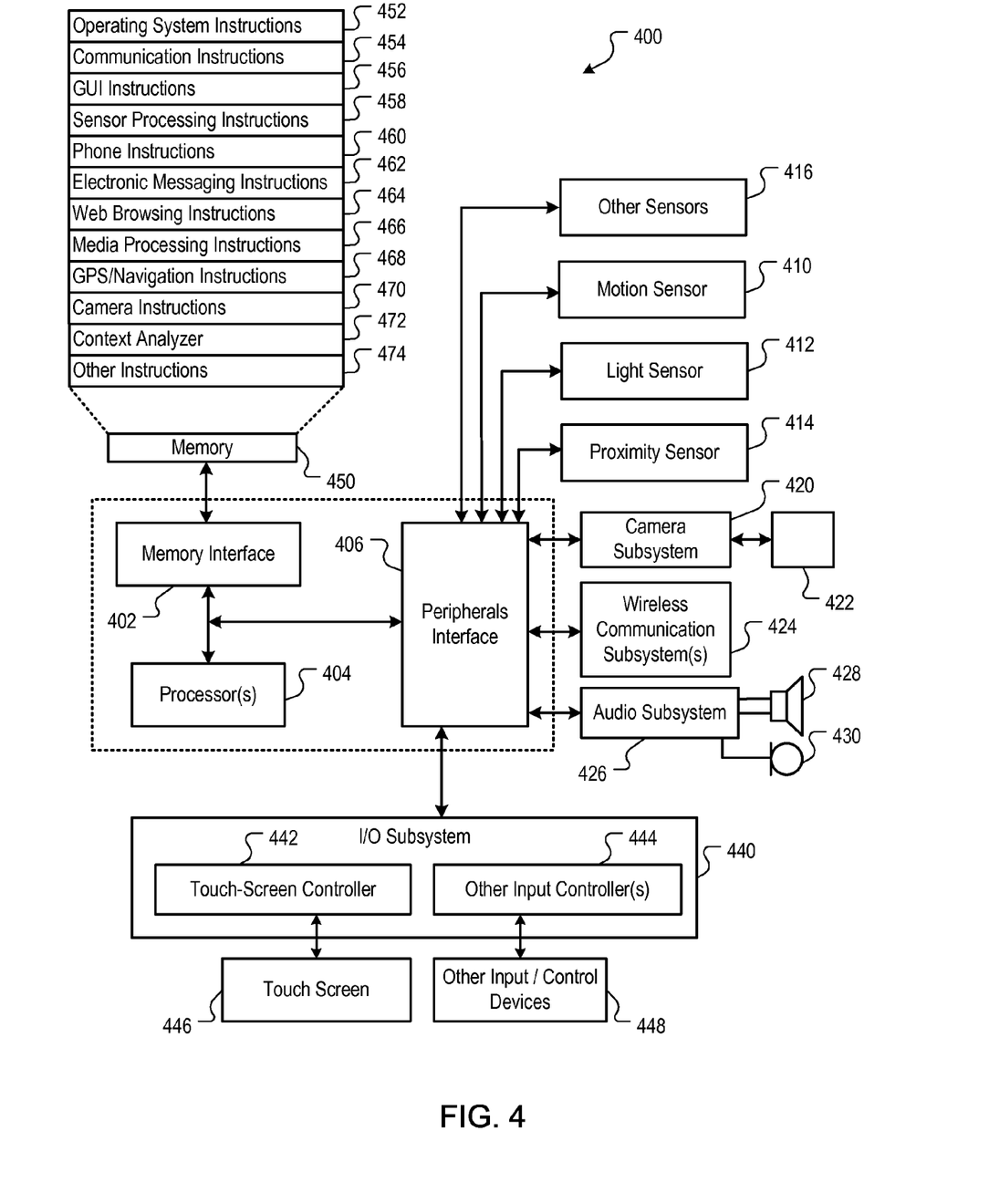
FIG. 4 is a block diagram of an example architecture of a location aware device capable of providing context based navigation solutions in accordance with some implementations.

FIG. 4 is a block diagram of an example architecture 400 of a location aware device capable of providing context based navigation solutions. The device can include memory interface 402, one or more data processors, image processors and/or central processing units 404, and peripherals interface 406. Memory interface 402, one or more processors 404 and/or peripherals interface 406 can be separate components or can be integrated in one or more integrated circuits. The various components in the device can be coupled by one or more communication buses or signal lines.

Sensors, devices, and subsystems can be coupled to peripherals interface 406 to facilitate multiple functionalities. For example, motion sensor 410, light sensor 412, proximity sensor 414 can be coupled to peripherals interface 406 to facilitate orientation, lighting, and proximity functions. Other sensors 416 can also be connected to peripherals interface 406, such as a positioning system (e.g., GPS receiver), a temperature sensor, a biometric sensor, magnetometer, FM or satellite radio, or other sensing device, to facilitate related functionalities.

Camera subsystem 420 and optical sensor 422, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 424, which can include radio frequency receivers and transmitters and/or optical (e.g., infrared) receivers and transmitters. The specific design and implementation of communication subsystem 424 can depend on the communication network(s) over which the device is intended to operate. For example, the device may include communication subsystems 424 designed to operate over a GSM network, a GPRS network, an EDGE network, a Wi-Fi or WiMax network, and a Bluetooth™ network. In particular, wireless communication subsystems 424 may include hosting protocols such that the device may be configured as a base station for other wireless devices.

Audio subsystem 426 can be coupled to speaker 428 and microphone 430 to facilitate voice-enabled functions, such as voice recognition, voice replication, digital recording, and telephony functions.

I/O subsystem 440 can include touch screen controller 442 and/or other input controller(s) 444. Touch-screen controller 442 can be coupled to touch screen 446 or touch pad. Touch screen 446 and touch screen controller 442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 446.

Other input controller(s) 444 can be coupled to other input/control devices 548, such as one or more buttons, rocker switches, thumb-wheel, infrared port, USB port, and/or a pointer device such as a stylus. One or more buttons (not shown) can include an up/down button for volume control of speaker 428 and/or microphone 430.

In one implementation, a pressing of the button for a first duration may disengage a lock of touch screen 446; and a pressing of the button for a second duration that is longer than the first duration may turn power to the device on or off. The user may be able to customize a functionality of one or more of the buttons. Touch screen 446 can, for example, also be used to implement virtual or soft buttons and/or a keyboard. In addition to touch screen 446, the device can also include a touch pad.

In some implementations, the device can present recorded audio and/or video files, such as MP3, AAC, and MPEG files. In some implementations, the device can include the functionality of an MP3 player, such as an iPod™. The device may, therefore, include a connector that is compatible with the iPod™. Other input/output and control devices can also be used.

Memory interface 402 can be coupled to memory 450. Memory 450 can include high-speed random access memory and/or non-volatile memory, such as one or more magnetic disk storage devices, one or more optical storage devices, and/or flash memory (e.g., NAND, NOR). Memory 450 can store an operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 can be a kernel (e.g., UNIX kernel).

Memory 450 may also store communication instructions 454 to facilitate communicating with one or more additional devices, one or more computers and/or one or more servers. Memory 450 may include graphical user interface instructions 456 to facilitate graphic user interface processing; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes and instructions (e.g., navigation engine 206); camera instructions 470 to facilitate camera-related processes and functions; and context analyzer 472 and other instructions 474 to facilitate the processes and functions described in reference to FIGS. 1-3, 5-6. Memory 450 may also store other software instructions (not shown), such as web video instructions to facilitate web video-related processes and functions; and/or web shopping instructions to facilitate web shopping-related processes and functions. In some implementations, media processing instructions 466 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 450.

Each of the above identified instructions and applications can correspond to a set of instructions for performing one or more functions described above. These instructions need not be implemented as separate software programs, procedures, or modules. Memory 450 can include additional instructions or fewer instructions. Furthermore, various functions of the device may be implemented in hardware and/or in software, including in one or more signal processing and/or application specific integrated circuits.

Example Navigation System

Figure 5:
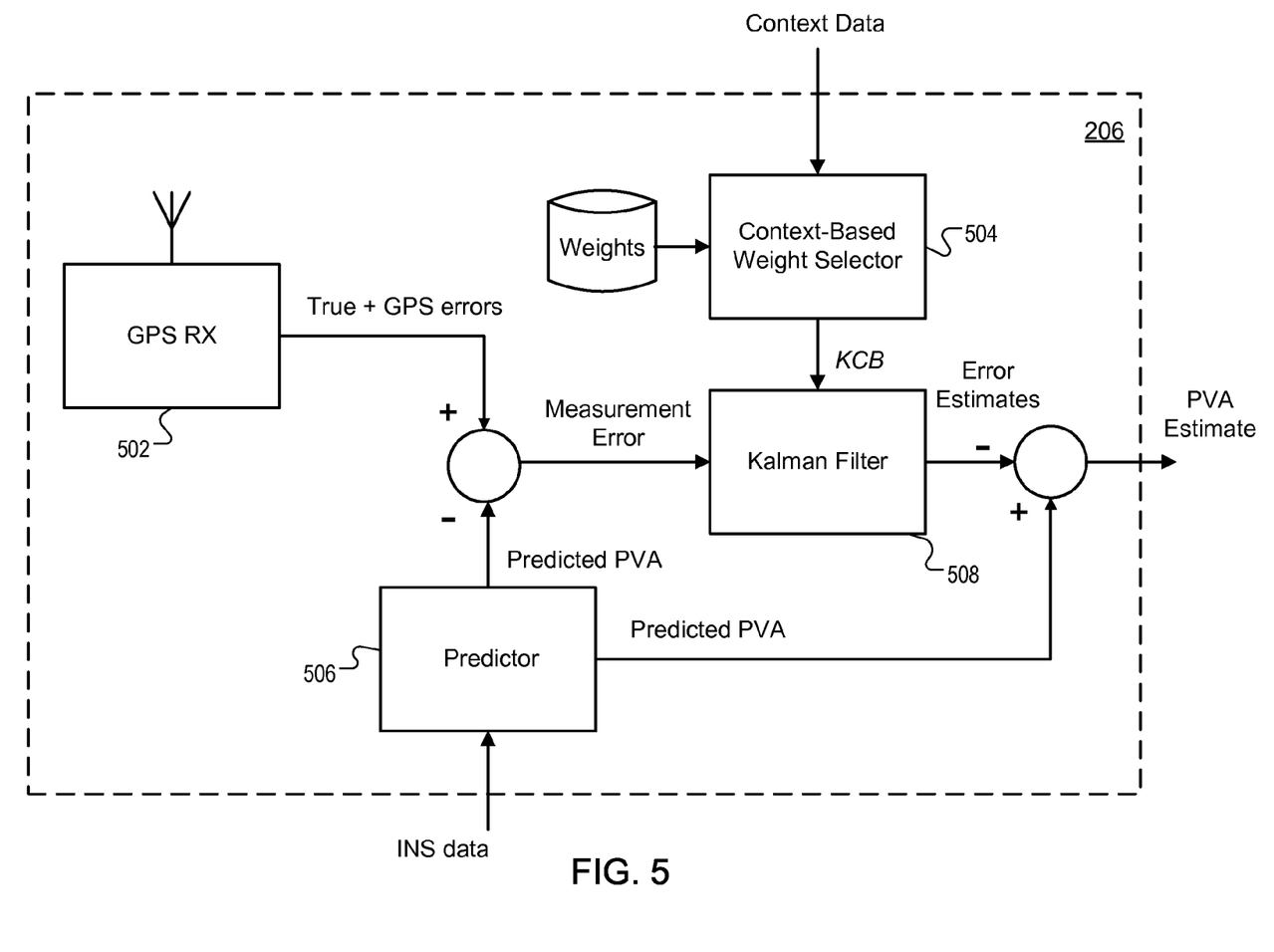
FIG. 5 is a block diagram of an example navigation engine that uses context data.

FIG. 5 is a block diagram of an example navigation engine 206 that uses context data. In some implementations, context data can be used in a loosely coupled or tightly coupled GPS/INS architecture in a location aware device. Navigation engine 206 can be included in one or more IC chips of a location aware device. In some implementations, navigation engine 206 can include GPS receiver (RX) 502, context based weight selector 504, predictor 506 and Kalman filter 508. Other configurations are possible, including configurations with more or fewer components or subsystems.

Kalman filter 508 is a linear, recursive estimator that produces a minimum variance estimate in a least squares sense under the assumption of white, Gaussian noise processes. Kalman filter 508 estimates errors in a navigation state (e.g., position, velocity, acceleration, heading) of a location aware device, and produces a measure of accuracy of its error state vector estimate, referred to as a covariance matrix. Kalman filter 508 weighs relative contributions of measurements of the navigation state and the dynamic behavior of the navigation state. The measurements and navigation state vector are weighted by their respective covariance matrices. If the measurements are inaccurate (large variances) when compared to the navigation state estimate, then Kalman filter 508 will de-weight the measurements. If the measurements are accurate (small variances) when compared to the navigation state estimate, then Kalman filter 508 will weight the measurements heavily with the consequence that its previously computed navigation state estimate will contribute little to the previous navigation state estimate.

In some implementations where inertial navigation system (INS) data is available (e.g., accelerometer output), predictor 506 can use the INS data to calculate a predicted navigation state. The predicted navigation state can be subtracted from the navigation state provided by GPS receiver 502 to generate measurement error. The measurement error is provided as input to Kalman filter 508. If context data is not available, Kalman filter 508 computes filter weights according to well-known Kalman filter equations described below. If context data is available, weight selector 504 will select context-based weights from a bank of context-based weights based on the context data. The selected context-based weights, KCB, is used by Kalman filter 508 to calculate error estimates. The error estimates can be subtracted from a predicted navigation state to provide a more accurate navigation state estimate.

For example, if context data indicates that a location aware device (e.g., a mobile phone including a GPS receiver) is not moving, then a set of context-based weights can be selected by weight selector 504 that cause a current estimate of position to contribute little or nothing to a previous estimate of position.

Similarly, if context data indicates that the location aware device is not turning (e.g., based on a magnetometer or gyroscope reading), then a set of context-based weights can be selected by weight selector 504 that cause a current estimate of heading to contribute little or nothing to a previous estimate of heading. A linear, discrete Kalman filter update state estimate equation is given by $$x_{k/k} = x_{k/k-1} + KCB_k[z_k - H_k x_{k/k-1}], \quad (1)$$

where $x_{k/k}$ is the current navigation state vector estimate at time k, $KCB_k$ is the context-based Kalman gain matrix selected at time k, $z_k$ is a measurement vector at time k, $H_k$ is a measurement matrix at time k, $x_{k/k-1}$ is the previous navigation state vector estimate at time k−1. The context-based Kalman gain matrix KCB can be selected to weight or de-weight the measurement vector $z_k$. In some implementations, a number of Kalman gain matrices corresponding to different context data can be stored on the location aware device. The coefficients of the Kalman gain matrices can be determined empirically using simulations and known techniques of Kalman filter design.

As can be seen from the above example, context data can be used to modify the weights of Kalman filter 508 to obtain a more accurate navigation state estimate. This improved accuracy provided by context data can help eliminate navigation errors (e.g., overshoot errors) which can result in inaccurate marker locations on a map view display.

Example State Estimation Process

Figure 6:
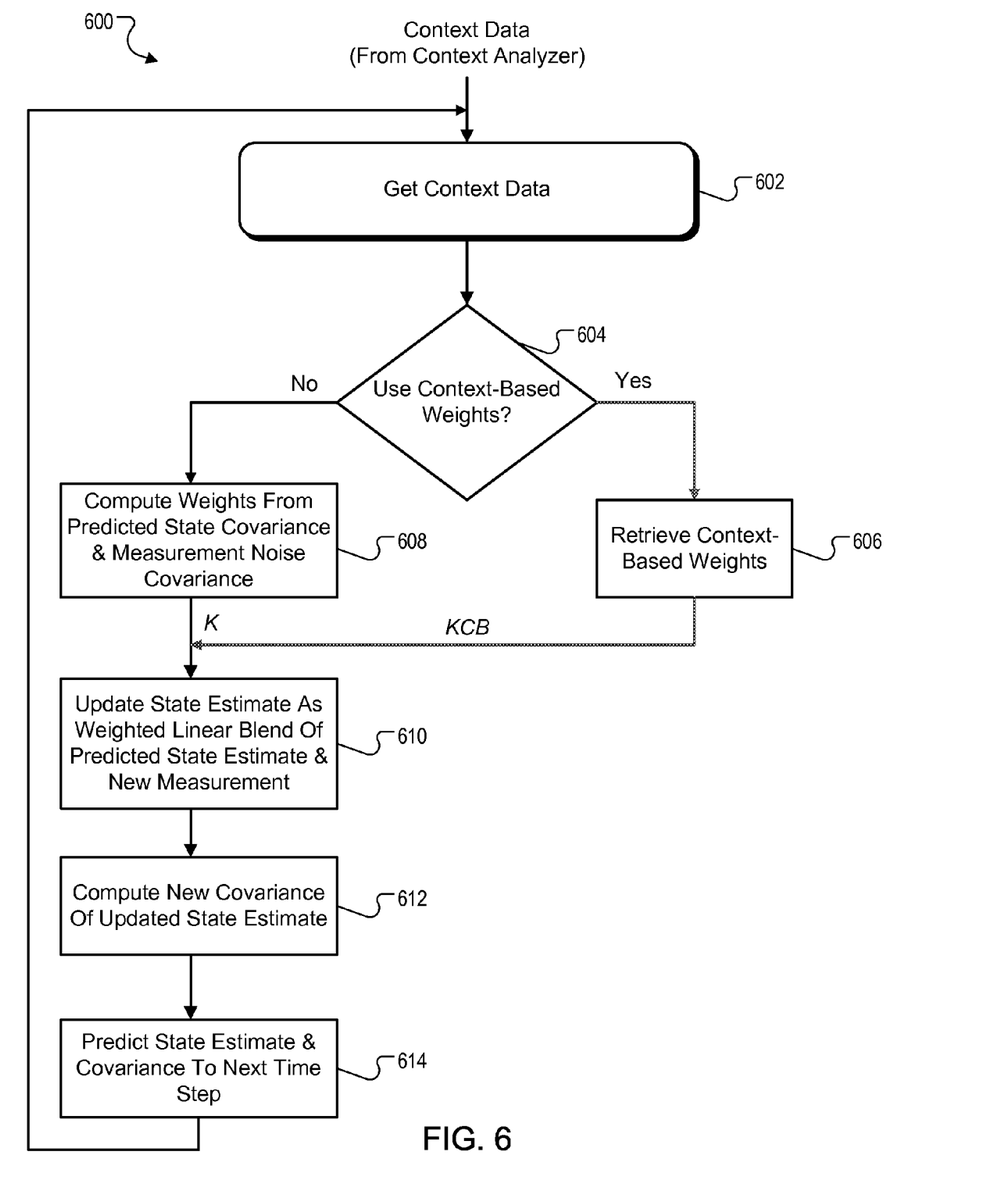
FIG. 6 is a flow diagram of an example navigation state estimation process that uses context data.

FIG. 6 is a flow diagram of an example state estimation process 600 that uses context data. For convenience, process 600 will be described in reference to navigation engine 206. The steps of process 600 need not occur sequentially or in the order described below.

Process 600 can begin by getting context data (602). The context data can be generated by context analyzer 204 in response to receiving output from one or more sensors 202. If context data is available (604), then the context-based weights corresponding to the context data are retrieved (606). If context data is not available (604), then weights are computed from the predicted state covariance and measurement noise covariance (608). In some implementations, the context-based weights are determined empirically based on simulation.

After the weights are either selected or computed, the state estimate is updated as a weighted linear blend of the predicted state estimate and a new measurement (610). A new covariance of the updated state estimated is computed (612). The state estimate and covariance is predicted to a next time step using a state transition matrix (614), and process 600 returns to step 602.

Equations for a linear, discrete Kalman filter are given by
1. Gain Computation $$K_k = P_{k/k-1} H_k^T [H_k P_{k/k-1} H_k^T + R_k]^{-1}, \quad (2)$$

2. Update Estimate $$x_{k/k} = x_{k/k-1} + [K_k \text{ or } KCB_k][z_k - H_k x_{k/k-1}], \quad (3)$$

3. Update Covariance $$P_{k/k} = [I - K_k H_k] P_{k/k-1}, \quad (4)$$

4. Prediction $$x_{k+1/k} = \Phi_k x_{k/k}$$

$$P_{k+1/k} = \Phi_k P_{k/k} \Phi_k^T + Q_k, \quad (5)$$

where P is a state covariance matrix, R is a measurement covariance matrix, $\Phi$ is a state transition matrix and Q is a process noise matrix. Equations 2-5 can be used to implement process 600 in a digital computer. If context data is available, then Equation (3) will use KCB; otherwise, Equation (3) will use K.

In some implementations, the process noise matrix Q and/or measurement covariance matrix R can be modified in a similar manner as the Kalman gain matrix K.

In some implementations, the context data can be used to adjust how location information (e.g., GPS data) is displayed to a user on, for example, a map view. For example, if at a particular time motion of a location aware device is classified as "not moving," and GPS data indicates that the device is moving, then an icon or marker representing the current location of the location aware device can be held at its current position. Similarly, the location aware device is classified as "not turning" and magnetometer or gyroscope data indicates that the device is turning, then the icon or marker can be held at its current orientation. Accordingly, in some implementations, the GPS data can be ignored for display purposes when context data contradicts the GPS data.

The disclosed and other implementations and the functional operations described in this specification can be implemented in digital electronic circuitry, or in computer software, firmware, or hardware, including the structures disclosed in this specification and their structural equivalents, or in combinations of one or more of them. The disclosed and other implementations can be implemented as one or more computer program products, e.g., one or more modules of computer program instructions encoded on a computer readable medium for execution by, or to control the operation of, a data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to a suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the disclosed implementations can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed implementations can be implemented in a computing system that includes a back end component, e.g., as a data server, or that includes a middleware component, e.g., an application server, or that includes a front end component, e.g., a client computer having a graphical user interface or a Web browser through which a user can interact with an implementation of what is disclosed here, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a location aware device, the method comprising:
    generating context data based on outputs from one or more sensors of the location aware device, the context data indicating at least one of whether the device is moving or whether the device is turning;
    determining, by a context-based weight selector of the device, one or more weights corresponding to the context data, each weight representing contribution of measurements of position or heading to previous measurements of position or heading, respectively;
    determining a navigation solution for the location aware device by a navigation subsystem of the device;
    determining an error estimate of the navigation solution using the one or more weights, including weighting or de-weighting measurements of the navigation subsystem using the one or more weights by a statistical filter of the device;
    determining whether to move or hold a position of an icon or marker in a map view based on whether the error estimate indicates that the navigation solution needs to be changed, where the icon or marker represents an estimated current location of the location aware device,
    where the method is performed by one or more hardware processors.

2. The method of claim 1, where the sensors include an accelerometer, a magnetometer or a gyroscope.

3. The method of claim 1, where each weight includes a Kalman gain matrix, and the statistical filter is a Kalman filter.

4. The method of claim 3, where the context data is sent to a navigation engine incorporated in an integrated circuit chip.

5. The method of claim 4, where the navigation engine uses output of a Global Positioning System (GPS) receiver.

6. The method of claim 1, comprising:
    determining, from data provided from an inertial navigation system of the device, a predicted navigation state; and
    providing a difference between the navigation solution and the predicted navigation state as input to the statistic filter.

7. The method of claim 1, where the measurements of position or heading are taken at time k, and the previous measurements of position or heading are taken at time k−1.

8. A location aware device, comprising:
one or more sensors; and
one or more processors coupled to the one or more sensors, the one or more processor configured to perform operations comprising:
generating context data based on outputs from the one or more sensors of the location aware device, the context data indicating at least one of whether the device is moving or whether the device is turning;
determining, by a context-based weight selector of the device, one or more weights corresponding to the context data, each weight representing contribution of measurements of position or heading to previous measurements of position or heading, respectively;
determining a navigation solution for the location aware device; by a navigation subsystem of the device;
determining an error estimate of the navigation solution using the one or more weights, including weighting or de-weighting measurements of the navigation subsystem using the one or more weights by a statistical filter of the device; and determining whether to move or hold a position of an icon or marker in a map view based on whether the error estimate indicates that the navigation solution needs to be changed, where the icon or marker represents an estimated current location of the location aware device.

9. The device of claim 8, where the one or more sensors include an accelerometer, a magnetometer or a gyroscope.

10. The device of claim 8, where each weight includes a Kalman gain matrix, and the statistical filter is a Kalman filter.

11. The device of claim 8, where the navigation solution is determined by a navigation engine incorporated in an integrated circuit chip.

12. The device of claim 11, where the navigation engine uses output of a Global Positioning System (GPS) receiver.

13. The device of claim 8, comprising:
determining, from data provided from an inertial navigation system of the device, a predicted navigation state; and
providing a difference between the navigation solution and the predicted navigation state as input to the statistic filter.

14. The device of claim 8, where the measurements of position or heading are taken at time k, and the previous measurements of position or heading are taken at time k−1.

15. A non-transitory computer readable medium storing instructions that, when executed by one or more processors, cause the one or more process to perform operations comprising:
generating context data based on outputs from one or more sensors of a location aware device, the context data indicating at least one of whether the device is moving or whether the device is turning;
determining, by a context-based weight selector of the device, one or more weights corresponding to the context data, each weight representing contribution of measurements of position or heading to previous measurements of position or heading, respectively;
determining a navigation solution for the location aware device by a navigation subsystem of the device;
determining an error estimate of the navigation solution using the one or more weights, including weighting or de-weighting measurements of the navigation subsystem using the one or more weights by a statistical filter of the device; and
determining whether to move or hold a position of an icon or marker in a map view based on whether the error estimate indicates that the navigation solution needs to be changed, where the icon or marker represents an estimated current location of the location aware device.

16. The non-transitory computer readable medium of claim 15, where each weight includes a Kalman gain matrix, and the statistical filter is a Kalman filter.

17. The non-transitory computer readable medium of claim 15, where the sensors include an accelerometer, a magnetometer or a gyroscope.

* * * * *

UNITED STATES PATENT AND TRADEMARK OFFICE
CERTIFICATE OF CORRECTION

| | | |
|---|---|---|
| PATENT NO. | : 9,116,002 B2 | Page 1 of 1 |
| APPLICATION NO. | : 12/549250 | |
| DATED | : August 25, 2015 | |
| INVENTOR(S) | : Robert Mayor et al. | |

It is certified that error appears in the above-identified patent and that said Letters Patent is hereby corrected as shown below:

IN THE CLAIMS

Column 12, Line 9; In Claim 15, delete "process" and insert -- processor --, therefor.

Signed and Sealed this
Fifteenth Day of March, 2016

Michelle K. Lee
*Director of the United States Patent and Trademark Office*